United States Patent
Jantzen, Jr.

(10) Patent No.: US 11,161,392 B1
(45) Date of Patent: Nov. 2, 2021

(54) VEHICLE VENTING ASSEMBLY AND SYSTEM

(71) Applicant: Johnny Jantzen, Jr., Red Bluff, CA (US)

(72) Inventor: Johnny Jantzen, Jr., Red Bluff, CA (US)

( * ) Notice: Subject to any disclaimer, the term of this patent is extended or adjusted under 35 U.S.C. 154(b) by 0 days.

(21) Appl. No.: 16/892,442

(22) Filed: Jun. 4, 2020

(51) Int. Cl.
*B60H 1/26* (2006.01)

(52) U.S. Cl.
CPC ............. *B60H 1/265* (2013.01); *B60H 1/267* (2013.01)

(58) Field of Classification Search
CPC ................................ B60H 1/265; B60H 1/267
See application file for complete search history.

(56) References Cited

U.S. PATENT DOCUMENTS

| | | | |
|---|---|---|---|
| 1,847,861 A * | 3/1932 | Bradbury | B60H 1/267 454/132 |
| 2,295,245 A * | 9/1942 | Tuttle | A24F 19/00 131/235.1 |
| 4,986,169 A | 1/1991 | Chen | |
| D324,418 S | 3/1992 | Shtanko | |
| 5,094,151 A | 3/1992 | Bernard | |
| 5,683,293 A | 11/1997 | Mohammed | |
| 6,672,954 B2 | 1/2004 | Shtanko | |
| 7,762,876 B2 | 7/2010 | McClary | |
| 2014/0311500 A1 | 10/2014 | Sanders | |

FOREIGN PATENT DOCUMENTS

WO    WO2000066381    9/2000

* cited by examiner

*Primary Examiner* — Jessica Yuen

(57) ABSTRACT

A vehicle venting assembly includes a panel that has an outer surface, an inner surface and a perimeter edge extending between the outer and inner surfaces. The perimeter edge includes a top edge, a bottom edge, a forward edge and a rear edge. The top edge has a shape matching a contour of an upper edge of a vehicle door window opening. The top edge is removably extendable into a window receiving slot of the upper edge. The panel has a vent opening therein extending through the outer and inner surfaces. A tube is coextensive with a peripheral edge of the vent opening and extends outwardly away from the outer surface. The inner surface faces an interior of the vehicle when the top edge is in the upper edge.

8 Claims, 5 Drawing Sheets

VEHICLE VENTING ASSEMBLY AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to venting device and more particularly pertains to a new venting device for positioning in the window opening of a vehicle door to allow smoke to be vented outwardly from the vehicle while keeping the window opening substantially closed.

(2) Description of Related Art Including Information Disclosed Under 37 CFR 1.97 and 1.98

The prior art relates to venting devices in general which are used to vent cigarette smoke as needed.

BRIEF SUMMARY OF THE INVENTION

An embodiment of the disclosure meets the needs presented above by generally comprising a panel that has an outer surface, an inner surface and a perimeter edge extending between the outer and inner surfaces. The perimeter edge includes a top edge, a bottom edge, a forward edge and a rear edge. The top edge has a shape matching a contour of an upper edge of a vehicle door window opening. The top edge is removably extendable into a window receiving slot of the upper edge. The panel has a vent opening therein extending through the outer and inner surfaces. A tube is coextensive with a peripheral edge of the vent opening and extends outwardly away from the outer surface. The inner surface faces an interior of the vehicle when the top edge is in the upper edge.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
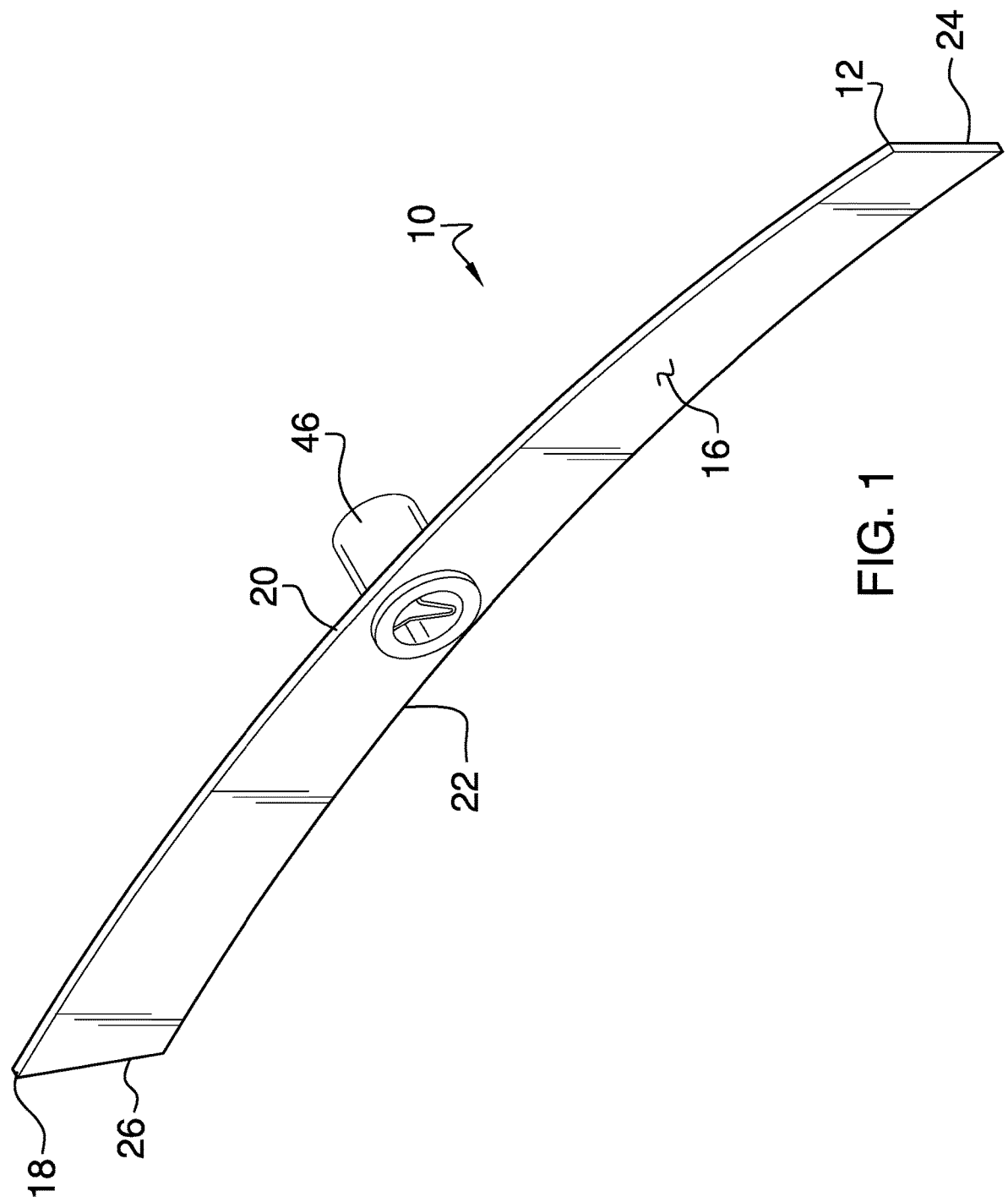
FIG. 1 is a rear isometric view of a vehicle venting assembly and system according to an embodiment of the disclosure.
Figure 2:
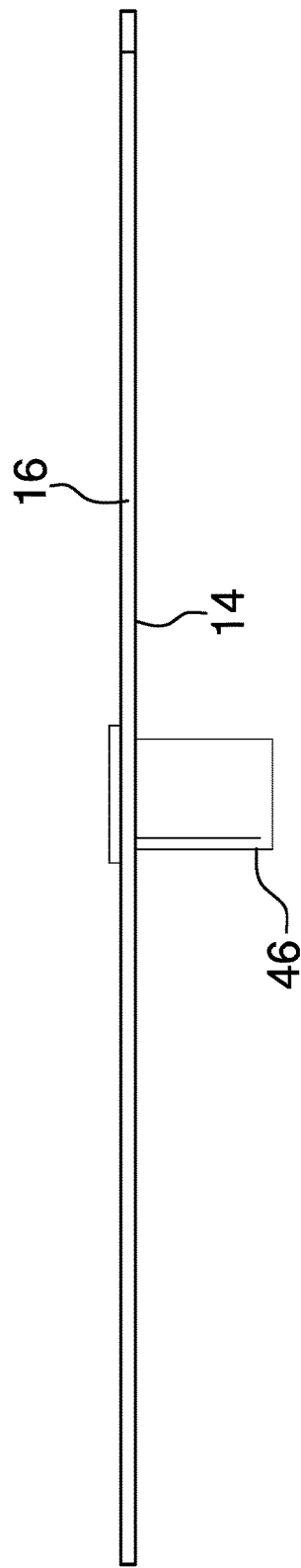
FIG. 2 is a top view of an embodiment of the disclosure.
Figure 3:
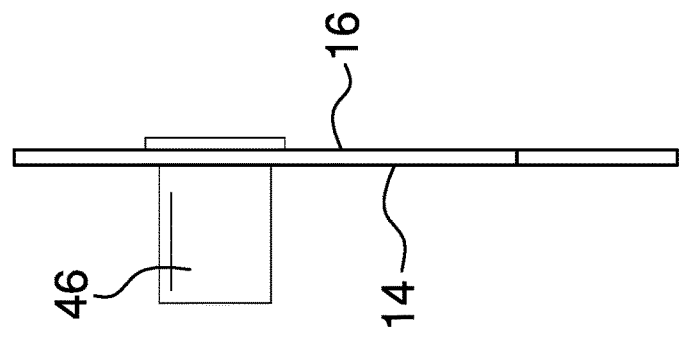
FIG. 3 is a side view of an embodiment of the disclosure.
Figure 4:
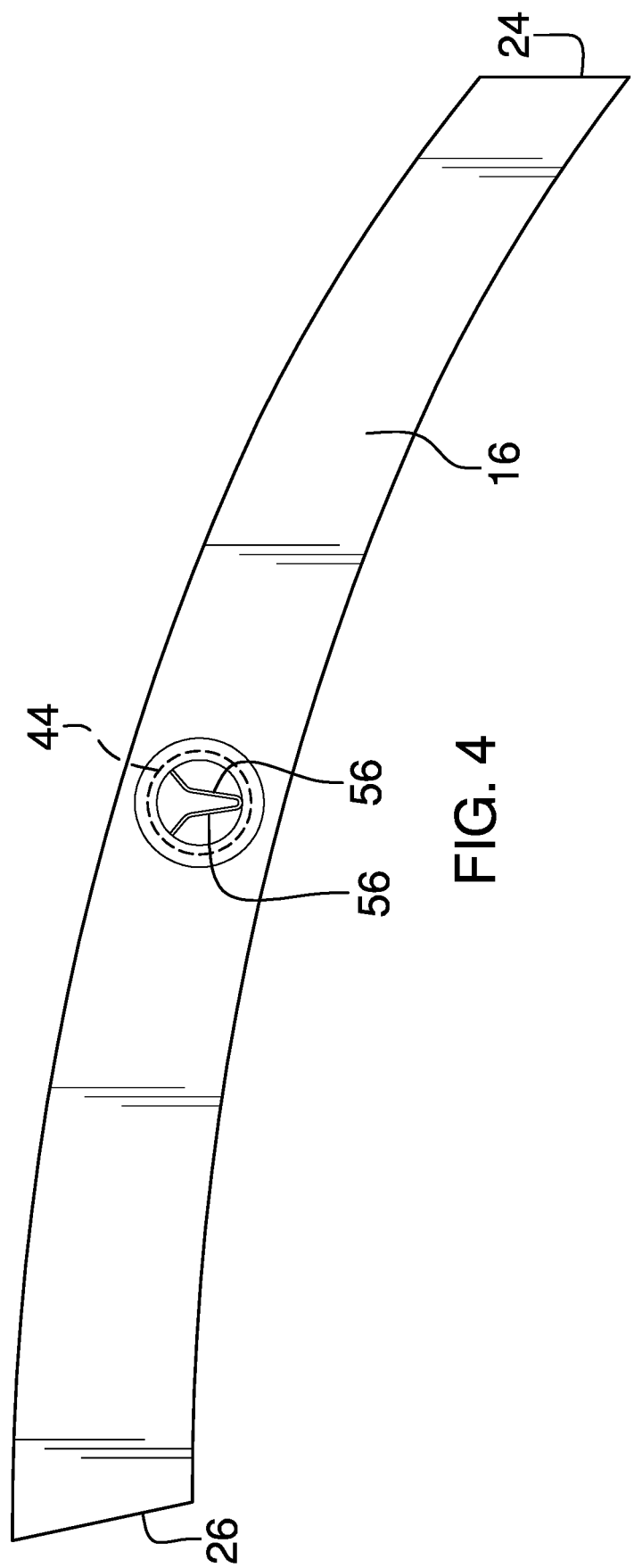
FIG. 4 is a rear view of an embodiment of the disclosure.
Figure 5:
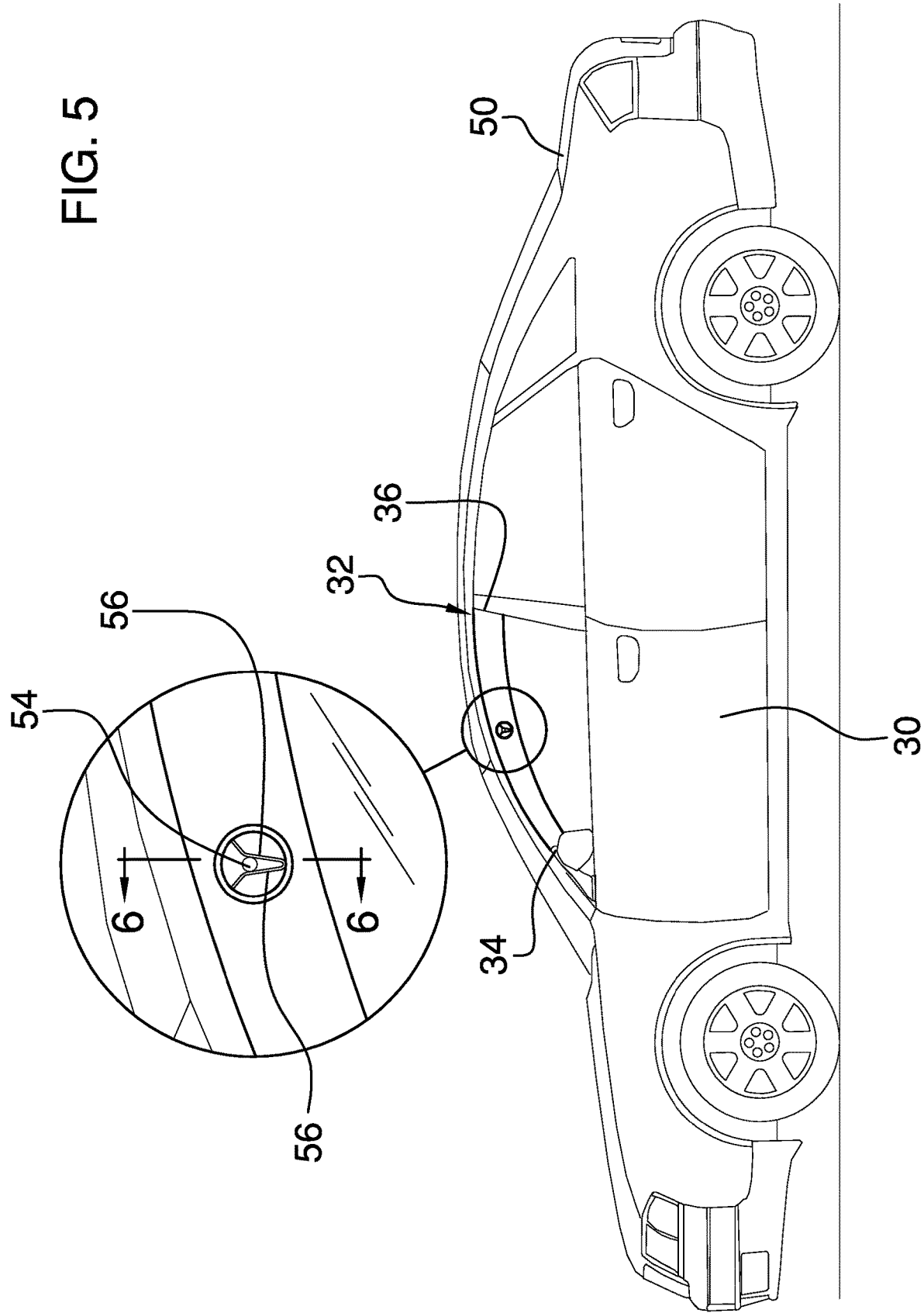
FIG. 5 is a front in-use view of an embodiment of the disclosure.
Figure 6:
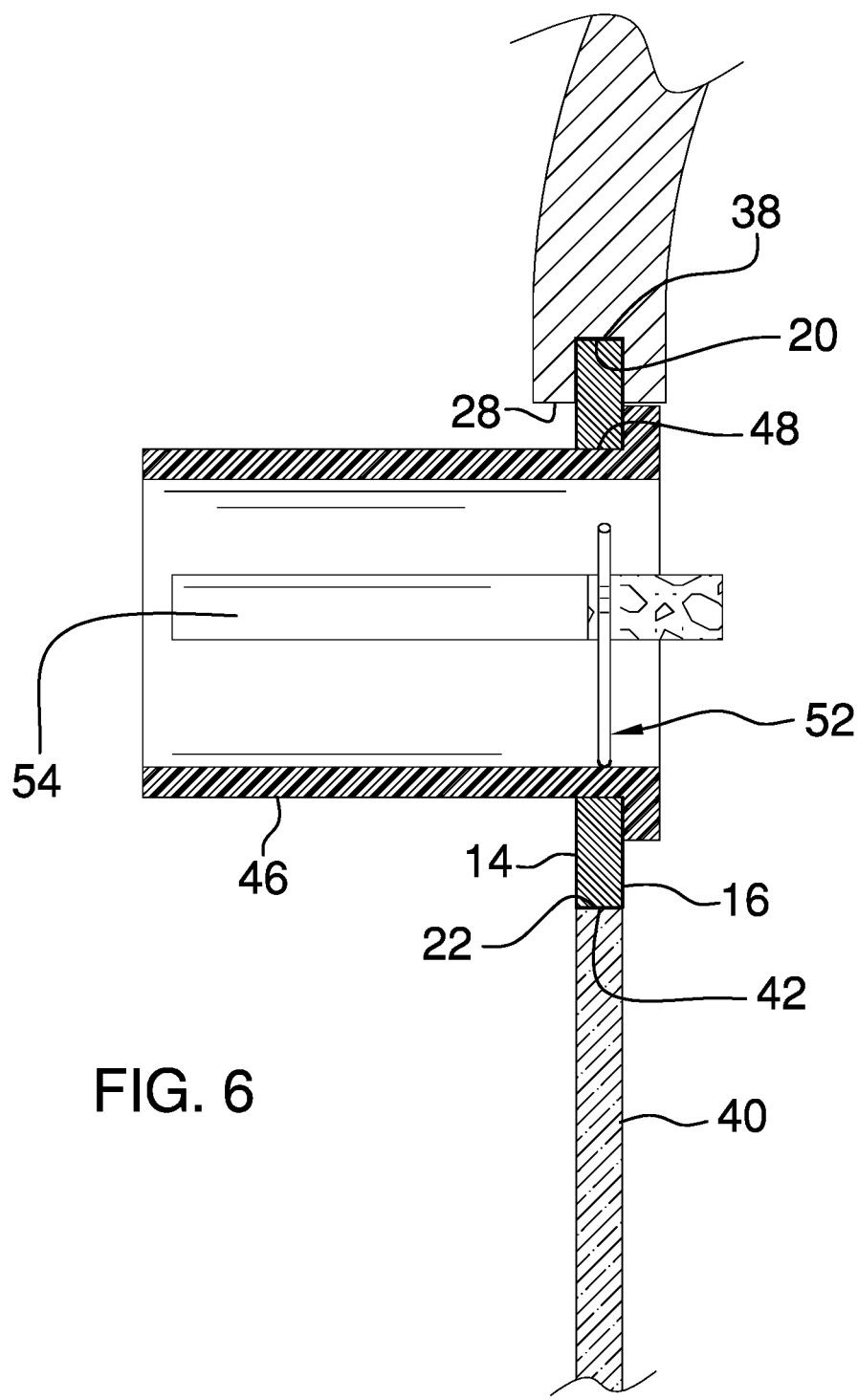
FIG. 6 is a cross-sectional view of an embodiment of the disclosure taken along line 6-6 of FIG. 5.

With reference now to the drawings, and in particular to FIGS. 1 through 6 thereof, a new venting device embodying the principles and concepts of an embodiment of the disclosure and generally designated by the reference numeral 10 will be described.

As best illustrated in FIGS. 1 through 6, the vehicle venting assembly and system 10 generally comprises a panel 12 that has an outer surface 14, an inner surface 16 and a perimeter edge 18 extending between the outer 14 and inner 16 surfaces. The panel 12 will typically be comprised of a plastic material that may be translucent or transparent. The perimeter edge 18 includes a top edge 20, a bottom edge 22, a forward edge 24 and a rear edge 26. The distance been the top 20 and bottom 22 edges is between 1.0 inches and 5.0 inches, and a distance between the forward edge 24 and the rear edge 26 is greater than 18.0 inches.

The top edge 20 has a shape matching a contour of an upper edge 28 of a vehicle door 30 window opening 32. As such, the top edge 20 will vary in shape and length but will typically have a convex arcuate shape. The length of the panel 12 will typically be such that it extends from a front side 34 to a back side 36 of the vehicle door 30 window opening 32. The top edge 20 is configured to be removably extendable into a window receiving slot 38 of the upper edge 28. This slot 38 is most often formed by a pair of seals or gaskets that envelope an upper side of a window 40. The panel 12 perimeter edge 18 has a depth from the outer surface to the inner surface 16 that is less than 0.40 inches and is frictionally engaged by the upper edge 28.

The bottom edge 22 has a shape matching an upper side 42 of the window 40 mounted in the vehicle door 30 window opening 32 such that the bottom edge 22 abuts the upper side 42 when the top edge 20 is positioned in the upper edge 28. Thus, as can be appreciated, the panel 12 will utilize and seal a portion of the window opening 32 typically occupied by the window 40 when the window 40 is in the fully closed position. The bottom edge 22 may include a slot, not shown, for receiving and forming a seal around the upper side 42 of the window 40.

The panel 12 has a vent opening 44 therein extending through the outer 14 and inner 16 surfaces. The vent opening 44 has a greatest width that is between 1.0 inches and 4.0 inches and may have a circular shape though other shapes are contemplated. A tube 46 is coextensive with a peripheral edge 48 of the vent opening 44 and extends outwardly away from the outer surface 14. For clarification, the inner surface 16 faces an interior of the vehicle 50 when the top edge 20 is in the upper edge 28. The tube 46 and panel 12 may be a unitary structure, the tube 46 may be positioned in the vent opening 44 and secured to the peripheral edge 48, or the tube 46 may be attached to the outer surface 14 and extend away therefrom. The tube 46 extends away from the outer surface 14 a distance between 1.0 inches and 5.0 inches and may extend slightly inwardly as well away from the inner surface.

A mount 52 is positioned in the tube 46 and is configured to releasably engage a personal smoking device 54. The personal smoking device 54 will typically comprise a cigarette but may comprise any device which is used by a person who is smoking and which typically has a burning, i.e. lit, end. The mount 52 may include a V-shaped wedge having a pair of angled legs 56 configured to frictionally engage the personal smoking device 54. The mount 52 will typically be comprised of a metallic material to prevent damage from heat emitted by the personal smoking device 54.

In use, the window 40 is opened sufficiently to place the panel 12 between the window 40 and the upper edge 28 of the window opening 32 such that the panel 12 can be extended into the upper edge 28 and the window 40 moved toward a closed position to abut the bottom edge 22. The window 40 and the friction of the upper edge 28 retain the panel 12 in position to close the window opening 32. When the vehicle 50 is being operated, its fan system will draw air into its interior such that the higher pressure will cause air to exit through the vent opening 44. By placing the personal smoking device 54, such as a cigarette, in or near the vent opening 44, the smoke emitted from the personal smoking device 54 will be vented to an exterior of the vehicle 50. The tube 46 protects the personal smoking device 54 from wind currents traveling over the vent opening 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smoke venting assembly configured to vent smoke outwardly of a vehicle, the assembly comprising:
    a panel having an outer surface, an inner surface and a perimeter edge extending between the outer and inner surfaces, the perimeter edge include a top edge, a bottom edge, a forward edge and a rear edge;
    the top edge having a shape matching a contour of an upper edge of a vehicle door window opening, the top edge being configured to be removably extendable into a window receiving slot of the upper edge;
    the panel having a vent opening therein extending through the outer and inner surfaces;
    a tube being coextensive with a peripheral edge of the vent opening and extending outwardly and perpendicularly away from the outer surface, wherein the inner surface faces an interior of the vehicle when the top edge is in the upper edge; and
    a mount being positioned in the tube and being configured to releasably engage a personal smoking device, the mount includes a V-shaped wedge having a pair of angled straight legs configured to frictionally engage the personal smoking device.

2. The smoke venting assembly according to claim 1, wherein a distance between the top and bottom edges is between 1.0 inches and 5.0 inches.

3. The smoke venting assembly according to claim 2, wherein a distance between the forward edge and the rear edge is greater than 18.0 inches.

4. The smoke venting assembly according to claim 2, wherein the vent opening has a greatest width being between 1.0 inches and 4.0 inches.

5. The smoke venting assembly according to claim 1, wherein the panel perimeter edge has a depth from the outer surface to the inner surface being less than 0.40 inches.

6. The smoke venting assembly according to claim 1, wherein the bottom edge has a shape matching an upper side of a window mounted in the vehicle door window opening such that the bottom edge abuts the upper side when the top edge is positioned in the upper edge.

7. The smoke venting assembly according to claim 1, wherein the tube extends away from the outer surface a distance between 1.0 inches and 5.0 inches.

8. A smoke venting assembly configured to vent smoke outwardly of a vehicle, the assembly comprising:
    a panel having an outer surface, an inner surface and a perimeter edge extending between the outer and inner surfaces, the perimeter edge include a top edge, a bottom edge, a forward edge and a rear edge, a distance been the top and bottom edges being between 1.0 inches and 5.0 inches, a distance between the forward edge and the rear edge being greater than 18.0 inches;
    the top edge having a shape matching a contour of an upper edge of a vehicle door window opening, the top edge being configured to be removably extendable into a window receiving slot of the upper edge, the panel perimeter edge having a depth from the outer surface to the inner surface being less than 0.40 inches;
    the bottom edge having a shape matching an upper side of a window mounted in the vehicle door window opening such that the bottom edge abuts the upper side when the top edge is positioned in the upper edge;
    the panel having a vent opening therein extending through the outer and inner surfaces, the vent opening having a greatest width being between 1.0 inches and 4.0 inches;
    a tube being coextensive with a peripheral edge of the vent opening and extending outwardly and perpendicularly away from the outer surface, wherein the inner surface faces an interior of the vehicle when the top edge is in the upper edge, the tube extending away from the outer surface a distance between 1.0 inches and 5.0 inches; and a mount being positioned in the tube and being configured to releasably engage a personal smoking device, the mount including a V-shaped wedge having a pair of angled straight legs configured to frictionally engage the personal smoking device.

* * * * *